United States Patent
Cao et al.

(10) Patent No.: US 11,323,916 B2
(45) Date of Patent: May 3, 2022

(54) FLOW CONTROL METHOD AND APPARATUS

(71) Applicant: HUAWEI TECHNOLOGIES CO., LTD., Guangdong (CN)

(72) Inventors: Zheng Cao, Shenzhen (CN); Xiaoli Liu, Shenzhen (CN); Nongda Hu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 16/834,192

(22) Filed: Mar. 30, 2020

(65) Prior Publication Data

US 2020/0229039 A1    Jul. 16, 2020

Related U.S. Application Data

(63) Continuation of application No. PCT/CN2018/106114, filed on Sep. 18, 2018.

(30) Foreign Application Priority Data

Sep. 30, 2017 (CN) .......................... 201710919292.2

(51) Int. Cl.
*H04W 28/10* (2009.01)
*H04W 28/02* (2009.01)
*H04W 28/04* (2009.01)

(52) U.S. Cl.
CPC ....... *H04W 28/10* (2013.01); *H04W 28/0231* (2013.01); *H04W 28/0289* (2013.01); *H04W 28/04* (2013.01)

(58) Field of Classification Search
CPC ............. H04W 28/10; H04W 28/0289; H04W 28/0231; H04W 28/04; H04L 47/39; H04L 47/12; H04L 47/115
See application file for complete search history.

(56) References Cited

U.S. PATENT DOCUMENTS 7,802,001 B1    9/2010   Petry et al.
9,198,078 B1   11/2015   Vivanco et al.
(Continued)

FOREIGN PATENT DOCUMENTS

CN    101030926 A    9/2007
CN    102404187 A    4/2012
(Continued)

OTHER PUBLICATIONS

Thushara Weerawardane;Andreas Timm-Giel;Gennaro C. Malafronte;Durastante Gianluca;Stephan Hauth;Carmelita Gorg; Preventive and Reactive Based TNL Congestion Control Impact on the HSDPA Performance; VTC Spring 2008—IEEE Vehicular Technology Conference Year: 2008.*
(Continued)

*Primary Examiner* — Kevin C. Harper
*Assistant Examiner* — Henry Baron
(74) *Attorney, Agent, or Firm* — Fish & Richardson P.C.

(57) ABSTRACT

This application provides a flow control method, including: sending, by a first device, a first data packet to a second device in a first sending mode; determining, by the first device, a network congestion status; and sending, by the first device, a second data packet to the second device in the second sending mode, where the second sending mode is a sending mode determined by the first device based on the network congestion status, and the second data packet is a data packet to be sent after the first data packet.

20 Claims, 7 Drawing Sheets

(56) References Cited

U.S. PATENT DOCUMENTS

2014/0164640 A1* 6/2014 Ye .................. H04L 47/30
　　　　　　　　　　　　　　　　　　　　　　　709/235
2014/0164641 A1　6/2014 Ye et al.

FOREIGN PATENT DOCUMENTS

| CN | 102546098 A | 7/2012 |
| --- | --- | --- |
| CN | 103384181 A | 11/2013 |
| CN | 106851727 A | 6/2017 |
| CN | 106134138 B | 2/2020 |

OTHER PUBLICATIONS

Garcia et al., "Efficient, scalable congestion management for interconnection networks," IEEE Micro 26(5), Oct. 2006, 15 pages.
PCT International Search Report and Written Opinion issued in International Application No. PCT/CN2018/106114 dated Nov. 29, 2018, 13 pages (with English translation).
Weerawardane et al., "Preventive and Reactive Based TNL Congestion Control Impact on the HSDPA Performance", XP031255974, May 11, 2008, 5 pages.
Extended European Search Report issued in European Application No. 18860424.3 dated Jul. 22, 2020, 6 pages.
Office Action issued in Chinese Application No. 201710919292.2 dated Feb. 26, 2021, 25 pages (with English translation).

* cited by examiner

FLOW CONTROL METHOD AND APPARATUS

CROSS-REFERENCE TO RELATED APPLICATIONS

This application is a continuation of International Application No. PCT/CN2018/106114, filed on Sep. 18, 2018, which claims priority to Chinese Patent Application No. 201710919292.2, filed on Sep. 30, 2017. The disclosures of the aforementioned applications are hereby incorporated by reference in their entireties.

TECHNICAL FIELD

This application relates to the communications field, and more specifically, to a flow control method and an apparatus.

BACKGROUND

To support different bandwidth and latency requirements of different applications that are increasingly evolving, a data center network needs to meet both a high network throughput requirement and a low network latency requirement. However, a network throughput and network latency are two mutually constrained indicators.

As shown in FIG. 1, when network load is relatively low, there is a basic linear relationship between growth of a network throughput and network load. As the network load increases, growth of network latency is relatively slow. When the network load is greater than or equal to a network optimal point, as the network load increases, the network throughput increases very slowly, but the network latency increases rapidly. When the network load is greater than or equal to a network saturation point, the network throughput drops sharply, and the latency rises sharply accordingly.

The network saturation point is maximum load of a network. When the network load is greater than or equal to the network saturation point, severe network congestion occurs. The network congestion may cause data packet loss, and further cause packet retransmission. Consequently, the network throughput decreases and the network latency increases sharply.

An objective of network flow control is to maximize the network throughput as much as possible and maintain relatively low network latency.

Generally, network flow control may be classified into passive flow control and active flow control. In a passive flow control mode, a source node pushes data to a target node. The source node obtains a congestion feedback after network congestion occurs, and then starts to limit flow input by the source node. Latency of this type of flow control is low. However, because flow is controlled only after network congestion occurs, congestion packet loss is likely to occur. This causes a decrease in network throughput. The passive flow control mode is more suitable for an underloaded application scenario with a low network throughput.

In an active flow control mode, before sending data to the target node, the source node first needs to request, from the target node, a volume of data for sending. After obtaining an authorized data volume returned by the target node, the source node starts to send data. Therefore, packet loss during network congestion can be avoided to some extent. However, in this flow control mode, a negotiation procedure needs to be performed in advance. Therefore, network latency is increased. The active flow control mode is suitable for ensuring a network throughput under overloading.

SUMMARY

This application provides a flow control method and an apparatus, so as to improve a network throughput and reduce network latency, and further reduce a probability of packet loss caused by network congestion.

According to a first aspect, a flow control method is provided, including: sending, by a first device, a first data packet to a second device in a first sending mode; determining, by the first device, a network congestion status; and sending, by the first device, a second data packet to the second device in the second sending mode, where the second sending mode is a sending mode determined by the first device based on the network congestion status, and the second data packet is a data packet to be sent after the first data packet.

The first device determines a current network congestion status in real time, and adjusts, in real time based on the current network congestion status, a sending mode for sending a data packet to the second device, so that the first device improves a network throughput and reduces network latency, and a probability of packet loss caused by network congestion can be reduced.

With reference to the first aspect, in a possible implementation of the first aspect, the first sending mode is a push mode, the second sending mode is a request-response mode, the first data packet carries first indication information, and the first indication information is used to indicate that the first data packet is a data packet sent in the push mode.

With reference to the first aspect, in a possible implementation of the first aspect, the sending, by the first device, a second data packet to the second device in the second sending mode includes: when the network is in a congested state, sending, by the first device, request information to the second device, where the request information is used to request the second device to allocate a data volume to the first device; and sending, by the first device, the second data packet to the second device by using the data volume allocated by the second device.

After sending the first data packet to the second device in the push mode, the first device determines the network congestion status. When the network is in the congested state, the first device sends a data packet to the second device in the request-response mode, so that the first device improves a network throughput and reduces network latency, and a probability of packet loss caused by network congestion can be reduced.

With reference to the first aspect, in a possible implementation of the first aspect, after the sending, by a first device, a first data packet to a second device in a first sending mode, the method further includes: receiving, by the first device, acknowledgement information sent by the second device, where the acknowledgement information is used to indicate that the second device successfully receives the first data packet; and the determining, by the first device, a network congestion status includes: determining, by the first device, a quantity of data packets that are in sent data packets and for which no acknowledgement information is received; determining, by the first device, the network congestion status based on the quantity of data packets for which no acknowledgement information is received, where the sent data packets include the first data packet; and if the quantity of data packets for which no acknowledgement information is received is greater than or equal to a preset first threshold, determining, by the first device, that the network is in the congested state.

The first device determines the network congestion status based on the quantity of data packets for which no acknowledgement information is received, and the first device sends the data packet to the second device in the request-response mode when the network is in the congested state, so that the first device improves a network throughput and reduces network latency, and a probability of packet loss caused by network congestion can be reduced.

With reference to the first aspect, in a possible implementation of the first aspect, the acknowledgement information carries a sending time point at which the first device sends the first data packet, and the method further includes: determining, by the first device, a receiving time point of the acknowledgement information; and determining, by the first device, the first threshold based on a difference between the receiving time point of the acknowledgement information and the sending time point of the first data packet.

With reference to the first aspect, in a possible implementation of the first aspect, the acknowledgement information carries a count value N, N≥1, and the count value N is used to indicate that first N data packets sent by the first device are all successfully received by the second device.

The acknowledgement information carries the count value N, so that the first device determines, based on the count value N carried in the acknowledgement information, that the received acknowledgement information is about acknowledgement performed by the second device for one data packet or more data packets. In this case, the first device can further determine the quantity of data packets for which no acknowledgement information is received.

Optionally, the second device may indicate, by using one piece of acknowledgement information that carries a count value, that a plurality of data packets sent by the first device are all successfully received.

The second device performs acknowledgement once for a plurality of data packets sent by the first device, so that occupation of network bandwidth by the acknowledgement information can be reduced. In addition, a count value is carried in the acknowledgement information, so that a case in which a piece of acknowledgement information sent by the second device is lost in a transmission process can be tolerated.

With reference to the first aspect, in a possible implementation of the first aspect, the first sending mode is a request-response mode, and the second sending mode is a push mode.

With reference to the first aspect, in a possible implementation of the first aspect, the sending, by the first device, a second data packet to the second device in the second sending mode includes: when the network is not in a congested state, sending, by the first device, the second data packet to the second device in the second sending mode.

The first device determines the network congestion status, and the first device sends the data packet to the second device in the push mode when the network is not in the congested state, so that the first device improves a network throughput and reduces network latency, and a probability of packet loss caused by network congestion can be reduced.

According to a second aspect, a flow control method is provided, including: receiving, by a second device, a first data packet sent by a first device in a first sending mode; and receiving, by the second device, a second data packet sent by the first device in a second sending mode, where the second sending mode is a sending mode determined by the first device based on the network congestion status, and the second data packet is a data packet to be sent after the first data packet.

The first device determines a current network congestion status in real time, and adjusts, in real time based on the current network congestion status, a sending mode for sending a data packet to the second device, so that the first device improves a network throughput and reduces network latency, and a probability of packet loss caused by network congestion can be reduced.

With reference to the second aspect, in a possible implementation of the second aspect, the first sending mode is a push mode, the second sending mode is a request-response mode, the first data packet carries first indication information, and the first indication information is used to indicate that the first data packet is a data packet sent in the push mode.

With reference to the second aspect, in a possible implementation of the second aspect, the method further includes: receiving, by the second device, request information sent by the first device, where the request information is used to request the second device to allocate a data volume to the first device, and the data volume is used by the first device to send the second data packet to the second device; and allocating, by the second device, the data volume to the first device based on the request information.

After sending the first data packet to the second device in the push mode, the first device determines the network congestion status. When a network is in a congested state, the first device sends a data packet to the second device in the request-response mode, so that the first device improves a network throughput and reduces network latency, and a probability of packet loss caused by network congestion can be reduced.

With reference to the second aspect, in a possible implementation of the second aspect, after the receiving, by a second device, a first data packet sent by a first device in a first sending mode, the method further includes: sending, by the second device, acknowledgement information to the first device, where the acknowledgement information is used to indicate that the second device successfully receives the first data packet.

The second device sends the acknowledgement information to the first device, so that the first device can determine the network congestion status based on a quantity of data packets for which no acknowledgement information is received, and the first device sends a data packet to the second device in the request-response mode when the network is in the congested state, so that the first device improves a network throughput and reduces network latency, and a probability of packet loss caused by network congestion can be reduced.

With reference to the second aspect, in a possible implementation of the second aspect, the acknowledgement information carries a sending time point at which the first device sends the first data packet.

With reference to the second aspect, in a possible implementation of the second aspect, the acknowledgement information carries a count value N, N≥1, and the count value N is used to indicate that first N data packets sent by the first device are all successfully received by the second device.

The acknowledgement information carries the count value N, so that the first device determines, based on the count value N carried in the acknowledgement information, that the received acknowledgement information is about acknowledgement performed by the second device for one data packet or more data packets. In this case, the first device can further determine the quantity of data packets for which no acknowledgement information is received.

Optionally, the second device may indicate, by using one piece of acknowledgement information that carries a count value, that a plurality of data packets sent by the first device are all successfully received.

The second device performs acknowledgement once for a plurality of data packets sent by the first device, so that occupation of network bandwidth by the acknowledgement information can be reduced. In addition, a count value is carried in the acknowledgement information, so that a case in which a piece of acknowledgement information sent by the second device is lost in a transmission process can be tolerated.

With reference to the second aspect, in a possible implementation of the second aspect, the first sending mode is a request-response mode, and the second sending mode is a push mode.

According to the flow control method in this embodiment of this application, the first device evaluates the congestion status of the network, and sends a data packet in the push mode when the network is underloaded, so as to reduce network latency; and sends a data packet in the request-response mode when network overload causes serious congestion, so as to alleviate a congestion degree of the network and improve a network throughput. The data packet sending mode is dynamically switched, so that all devices in the network transmit data packets in the push mode when the network is underloaded, some devices in the network transmit data packets in the request-response mode when the network is slightly congested, and all the devices in the network transmit data packets in the request-response mode when the network overload causes serious congestion, thereby implementing a relatively high network throughput and reducing network latency.

According to a third aspect, a flow control method is provided. The method is applied to a transmission scenario that includes at least two sending modes. The at least two sending modes are a push mode and a request-response mode. The method includes: determining, by a first device, a network congestion status; determining, by the first device based on the network congestion status, a sending mode of a target data packet to be sent to a second device, where the sending mode of the target data packet is the push mode or the request-response mode; and sending, by the first device, the target data packet to the second device in the sending mode of the target data packet.

The first device determines a current network congestion status in real time, and determines, in real time based on the current network congestion status, a sending mode for sending a data packet to the second device, so that the first device improves a network throughput and reduces network latency, and a probability of packet loss caused by network congestion can be reduced.

With reference to the third aspect, in a possible implementation of the third aspect, the determining, by the first device based on the network congestion status, a sending mode of a target data packet to be sent to a second device includes: when the network is not in a congested state, sending, by the first device, the target data packet to the second device in the push mode; or when the network is in a congested state, sending, by the first device, the target data packet to the second device in the request-response mode.

The first device determines the network congestion status. The first device sends the data packet to the second device in the push mode when the network is not in the congested state, or the first device sends the data packet to the second device in the request-response mode when the network is in the congested state. The first device determines, based on the network congestion status, a sending mode for sending the data packet to the second device, so that the first device improves a network throughput and reduces network latency, and a probability of packet loss caused by network congestion can be reduced.

With reference to the third aspect, in a possible implementation of the third aspect, the method further includes: receiving, by the first device, acknowledgement information sent by the second device, where the acknowledgement information is used to indicate that the second device successfully receives the target data packet; and the determining, by the first device, a network congestion status includes: determining, by the first device, a quantity of data packets that are in sent data packets and for which no acknowledgement information is received; determining, by the first device, the network congestion status based on the quantity of data packets for which no acknowledgement information is received, where the sent data packets include the target data packet; and if the quantity of data packets for which no acknowledgement information is received is greater than or equal to a preset first threshold, determining, by the first device, that the network is in the congested state.

The first device determines the network congestion status based on the quantity of data packets for which no acknowledgement information is received, and the first device sends the data packet to the second device in the request-response mode when the network is in the congested state, so that the first device improves a network throughput and reduces network latency, and a probability of packet loss caused by network congestion can be reduced.

With reference to the third aspect, in a possible implementation of the third aspect, the acknowledgement information carries a sending time point at which the first device sends the target data packet. The method further includes: determining, by the first device, a receiving time point of the acknowledgement information; and determining, by the first device, the first threshold based on a difference between the receiving time point of the acknowledgement information and the sending time point of the first data packet.

With reference to the third aspect, in a possible implementation of the third aspect, the acknowledgement information carries a count value N, N≥1, and the count value N is used to indicate that first N data packets sent by the first device are all successfully received by the second device.

The acknowledgement information carries the count value N, so that the first device determines, based on the count value N carried in the acknowledgement information, that the received acknowledgement information is about acknowledgement performed by the second device for one data packet or more data packets. In this case, the first device can further determine the quantity of data packets for which no acknowledgement information is received.

Optionally, the second device may indicate, by using one piece of acknowledgement information that carries a count value, that a plurality of data packets sent by the first device are all successfully received.

The second device performs acknowledgement once for a plurality of data packets sent by the first device, so that occupation of network bandwidth by the acknowledgement information can be reduced. In addition, a count value is carried in the acknowledgement information, so that a case in which a piece of acknowledgement information sent by the second device is lost in a transmission process can be tolerated.

According to a fourth aspect, a flow control method is provided. The method is applied to a transmission scenario that includes at least two sending modes. The at least two sending modes are a push mode and a request-response mode. The method includes: receiving, by a second device, the target data packet sent by the first device to the second device in a sending mode of the target data packet, where the sending mode of the target data packet is the push mode or the request-response mode.

The first device determines a current network congestion status in real time, and determines, in real time based on the current network congestion status, a sending mode for sending a data packet to the second device, so that the first device improves a network throughput and reduces network latency, and a probability of packet loss caused by network congestion can be reduced.

With reference to the fourth aspect, in a possible implementation of the fourth aspect, the method further includes: sending, by the second device, acknowledgement information to the first device, where the acknowledgement information is used to indicate that the second device successfully receives the target data packet.

The second device sends the acknowledgement information to the first device, so that the first device can determine the network congestion status based on a quantity of data packets for which no acknowledgement information is received, and the first device sends a data packet to the second device in the request-response mode when a network is in a congested state, so that the first device improves a network throughput and reduces network latency, and a probability of packet loss caused by network congestion can be reduced.

With reference to the fourth aspect, in a possible implementation of the fourth aspect, the acknowledgement information carries a sending time point at which the first device sends the target data packet.

With reference to the fourth aspect, in a possible implementation of the fourth aspect, the acknowledgement information carries a count value N, N≥1, and the count value N is used to indicate that first N data packets sent by the first device are all successfully received by the second device.

The acknowledgement information carries the count value N, so that the first device determines, based on the count value N carried in the acknowledgement information, that the received acknowledgement information is about acknowledgement performed by the second device for one data packet or more data packets. In this case, the first device can further determine the quantity of data packets for which no acknowledgement information is received.

Optionally, the second device may indicate, by using one piece of acknowledgement information that carries a count value, that a plurality of data packets sent by the first device are all successfully received.

The second device performs acknowledgement once for a plurality of data packets sent by the first device, so that occupation of network bandwidth by the acknowledgement information can be reduced. In addition, a count value is carried in the acknowledgement information, so that a case in which a piece of acknowledgement information sent by the second device is lost in a transmission process can be tolerated.

According to a fifth aspect, a first device is provided, and the first device is configured to perform the flow control method in any one of the first aspect or the possible implementations of the first aspect. Specifically, the first device may include a module configured to perform the flow control method in any one of the first aspect or possible implementations of the first aspect.

According to a sixth aspect, a first device is provided. The first device includes a memory and a processor. The memory is configured to store an instruction, and the processor is configured to execute the instruction stored in the memory. The execution of the instruction stored in the memory enables the processor to perform the method in any one of the first aspect or the possible implementations of the first aspect.

According to a seventh aspect, a computer readable storage medium is provided, and a computer program is stored in the computer readable storage medium. The program is executed by a processor to perform the method in any one of the first aspect or the possible implementations of the first aspect.

According to an eighth aspect, a second device is provided, and the second device is configured to perform the flow control method in any one of the second aspect or the possible implementations of the second aspect. Specifically, the second device may include a module configured to perform the flow control method in any one of the second aspect or possible implementations of the second aspect.

According to a ninth aspect, a second device is provided. The second device includes a memory and a processor. The memory is configured to store an instruction, and the processor is configured to execute the instruction stored in the memory. The execution of the instruction stored in the memory enables the processor to perform the method in any one of the second aspect or the possible implementations of the second aspect.

According to a tenth aspect, a computer readable storage medium is provided, and a computer program is stored in the computer readable storage medium. The program is executed by a processor to perform the method in any one of the second aspect or the possible implementations of the second aspect.

DESCRIPTION OF EMBODIMENTS

Figure 1:
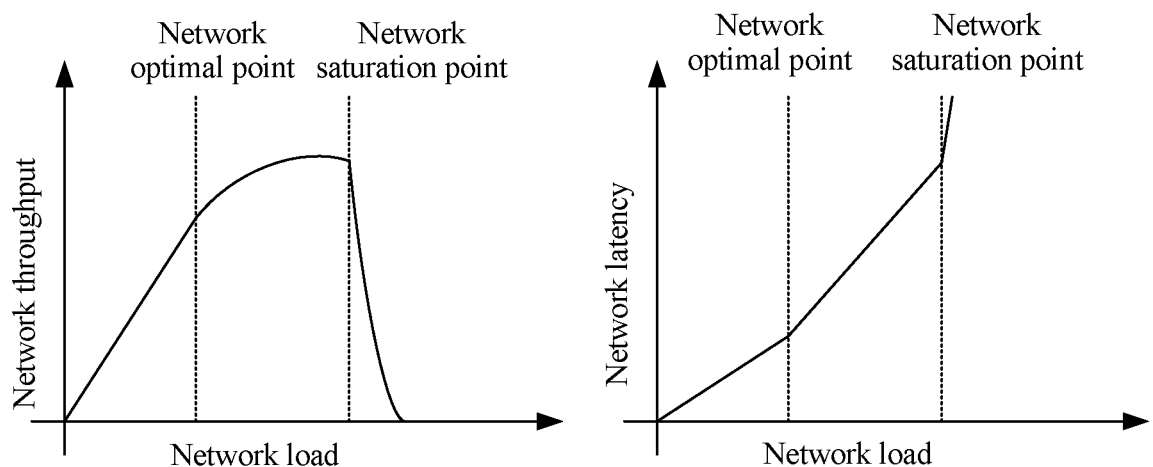
FIG. 1 is a schematic diagram of a relationship between a network throughput/network latency and network load.

The following describes the technical solutions in this application with reference to the accompanying drawings.

The technical solutions in the embodiments of this application may be applied to various communications systems, such as: a Global System for Mobile Communications (Global System for Mobile communications, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS) system, a Long Term Evolution (Long Term Evolution, LTE) system, an LTE frequency division duplex (Frequency Division Duplex, FDD) system, an LTE time division duplex (Time Division Duplex, TDD) system, a Universal Mobile Telecommunications System (Universal Mobile Telecommunications System, UMTS), a Worldwide Interoperability for Microwave Access (Worldwide Interoperability for Microwave Access, WiMAX) communications system, a future 5th generation (5th Generation, 5G) system, or a new radio (New Radio, NR) system.

A terminal device in the embodiments of this application may refer to user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, a terminal device in a future 5G network, a terminal device in a future evolved public land mobile network (Public Land Mobile Network, PLMN), or the like, which is not limited in the embodiments of this application.

The network device in the embodiments of this application may be a device configured to communicate with a terminal device. The network device may be a base transceiver station (Base Transceiver Station, BTS) in Global System for Mobile Communications (Global System for Mobile Communications, GSM) or Code Division Multiple Access (Code Division Multiple Access, CDMA), or may be a NodeB (NodeB, NB) in a Wideband Code Division Multiple Access (Wideband Code Division Multiple Access, WCDMA) system, or may be an evolved NodeB (Evolved NodeB, eNB or eNodeB) in an LTE system, or may be a radio controller in a cloud radio access network (Cloud Radio Access Network, CRAN) scenario. Alternatively, the network device may be a relay station, an access point, an in-vehicle device, a wearable device, or a network device in a future 5G network, or a network device in a future evolved PLMN network. This is not limited in the embodiments of this application.

Figure 2:
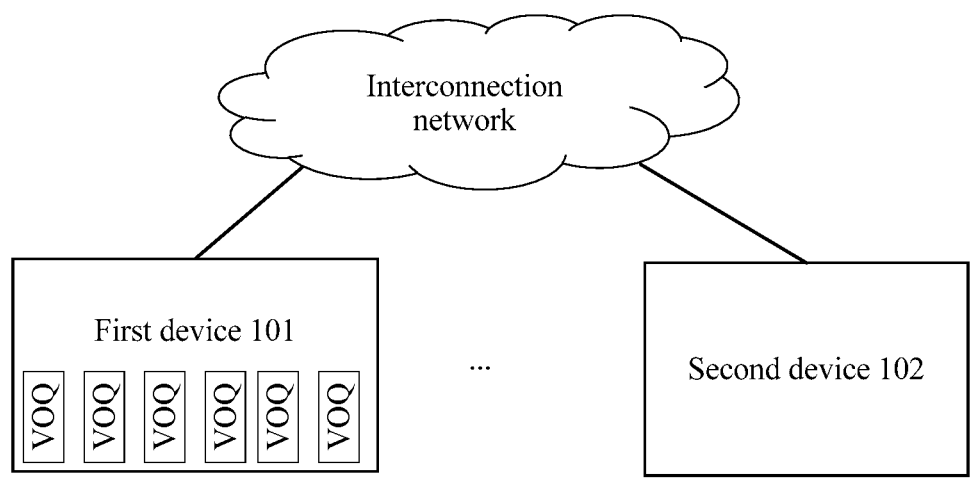
FIG. 2 is a schematic diagram of a system architecture according to an embodiment of this application.

FIG. 2 is a schematic diagram of a typical system architecture according to an embodiment of this application. For simplicity, FIG. 2 describes a simplified network architecture. A first device 101 and a second device 102 are connected by using an interconnection network. The first device 101 or the second device 102 may be a terminal host device, or may be a switching device. The first device 101 may simultaneously communicate with a plurality of second devices 102.

A plurality of virtual output queues (Virtual Output Queue, VOQ) in the first device 101 are in a one-to-one correspondence with the plurality of second devices 102. When the first device 101 needs to send data packets to second devices 102, the first device 101 first buffers the data packets in VOQ queues corresponding to the second devices 102, and then sends the buffered data packets in the VOQ queues to the second devices 102 successively.

The embodiments of this application are applicable to an application scenario that has a switching network, for example, a data center network.

Figure 3:
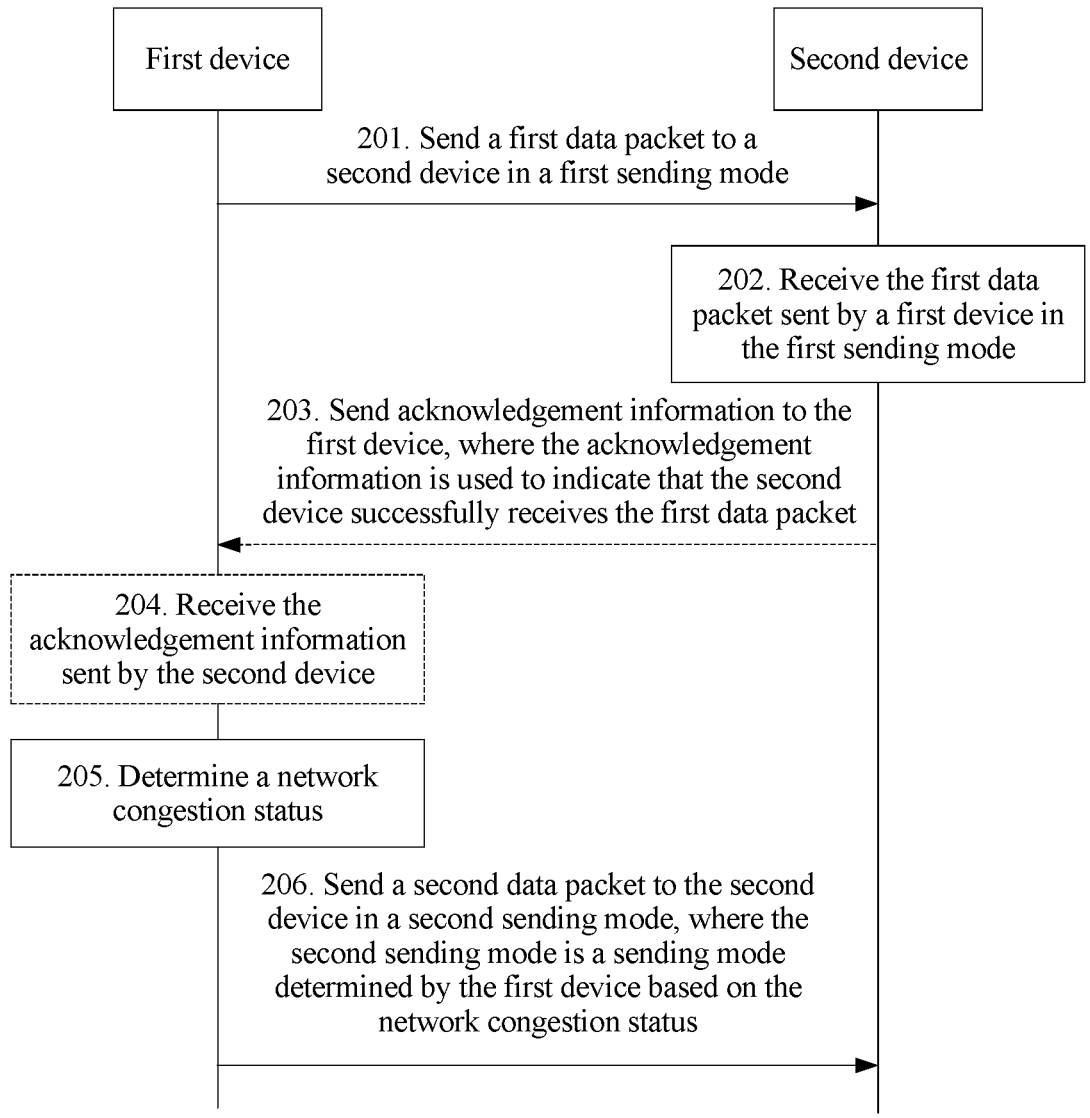
FIG. 3 is a schematic flowchart of a flow control method according to an embodiment of this application.

FIG. 3 is a schematic flowchart of a flow control method 200 according to an embodiment of this application. A first device described in FIG. 3 may be the first device 101 in FIG. 2; and a second device described in FIG. 3 may be the second device 102 in FIG. 2. Certainly, in an actual system, a quantity of first devices and a quantity of second devices may not be limited to an example in this embodiment or another embodiment of this application, and details are not described below. The method 200 includes at least the following steps.

201. The first device sends a first data packet to the second device in a first sending mode.

202. The second device receives the first data packet sent by the first device in the first sending mode.

205. The first device determines a network congestion status.

Specifically, in 201, 202, and 205, the first device first sends the first data packet to the second device in the first sending mode, and in a process of sending the first data packet to the second device in the first sending mode, the first device determines a current network congestion status. For example, the first device determines that a current network is in a congested state.

206. The first device sends a second data packet to the second device in the second sending mode, where the second sending mode is a sending mode determined by the first device based on the network congestion status, and the second data packet is a data packet to be sent after the first data packet.

Specifically, the first device determines, based on the network congestion status, to switch from the first sending mode to the second sending mode. For example, in 205, if the first device determines that the current network is in the congested state, in 206, the first device determines to switch from the first sending mode to the second sending mode, and sends the second data packet to the second device in the second sending mode, where the second data packet is a data packet that the first device needs to send to the second device after the first data packet.

The first device determines a current network congestion status in real time, and adjusts, in real time based on the current network congestion status, a sending mode for sending a data packet to the second device, so that the first device improves a network throughput and reduces network latency, and a probability of packet loss caused by network congestion can be reduced.

In this embodiment of this application, that the first device determines, based on the network congestion status, to send the second data packet to the second device in the second sending mode includes two cases in total.

Case 1:

The first sending mode is a push mode, and the second sending mode is a request-response mode. When determining that the current network is in the congested state, the first device determines to switch a data packet sending mode, that is, determines to send the second data packet to the second device in the request-response mode. The first data packet carries first indication information, and the first indication information is used to indicate that the first data packet is a data packet sent in the push mode.

Case 2:

The first sending mode is a request-response mode, and the second sending mode is a push mode. When determining that the current network is not in the congested state, the first device determines to switch a data packet sending mode, that is, determines to send the second data packet to the second device in the push mode.

A technical solution corresponding to case 1 is described in detail below.

Specifically, in case 1, the first device buffers the first data packet in a VOQ queue corresponding to the second device, and sends the first data packet to the second device in the push mode. The first data packet carries the first indication information, and the first indication information is used to indicate to the second device that the first data packet is a data packet sent by the first device in the push mode, so that the second device determines, based on the first indication information, that the data packet is a data packet sent in the push mode.

It should be noted that the push mode means that when the first device needs to send a data packet, the first device sends the data packet to the second device.

It should be further noted that the foregoing description is provided by using an example in which the first indication information is used to indicate to the second device that the first data packet is a data packet sent in the push mode. However, this is not limited in this embodiment of this application. For example, the first device may mark the first data packet, so that when receiving the first data packet, the second device determines that the first data packet is a data packet sent in the push mode.

In the process in which the first device sends the first data packet to the second device in the push mode, the first device determines the network congestion status. If the first device determines that the current network is in the congested state, the first device switches the data packet sending mode, that is, determines to send the second data packet to the second device in the request-response mode.

When sending the second data packet to the second device in the request-response mode, the first device first sends request information to the second device. The request information is used to request the second device to allocate a data volume to the first device, and the data volume is used to restrict the first device from sending the second data packet to the second device.

Optionally, when the first device determines to send the second data packet to the second device in the request-response mode, the first device marks a VOQ queue corresponding to the second device as a VOQ queue in a request-response state, and sets an authorized data volume counter for the VOQ queue. Before sending the request information to the second device, the first device may first view the authorized data volume counter, and determine whether a data volume for sending that is indicated by the authorized data volume counter meets a requirement for sending a complete data packet.

If the data volume for sending can meet the requirement, the first device sends a data packet to the second device based on the data volume for sending that is indicated by the authorized data volume counter, and subtracts a data volume used for sending the data packet from the authorized data volume counter.

If the data volume for sending cannot meet the requirement, the first device sends the request information to the second device. The request information carries a data volume requested by the first device for sending. After receiving the request information sent by the first device, the second device may allocate, to the first device based on a rate of the second device or an available volume of a buffer, a data volume for sending, and send response information to the first device. The response information carries the data volume for sending.

After receiving the response information sent by the second device, the first device may update, based on the data volume for sending that is carried in the response information, the authorized data volume counter of the VOQ queue corresponding to the second device.

Optionally, for the foregoing case 1, after 202, as shown in FIG. 3, the method further includes 203 and 204.

203. The second device sends acknowledgement information to the first device, where the acknowledgement information is used to indicate that the second device successfully receives the first data packet.

204. The first device receives the acknowledgement information sent by the second device, where the acknowledgement information is used to indicate that the second device successfully receives the first data packet.

Specifically, in 203, after receiving the first data packet sent by the first device, the second device determines, based on the first indication information carried in the first data packet, that the first data packet is a data packet sent in the push mode. In this case, the second device sends the acknowledgement information to the first device. The acknowledgement information is used to indicate that the second device successfully receives the first data packet. In 204, after receiving the acknowledgement information, the first device may determine that the second device successfully receives the first data packet.

Figure 4:
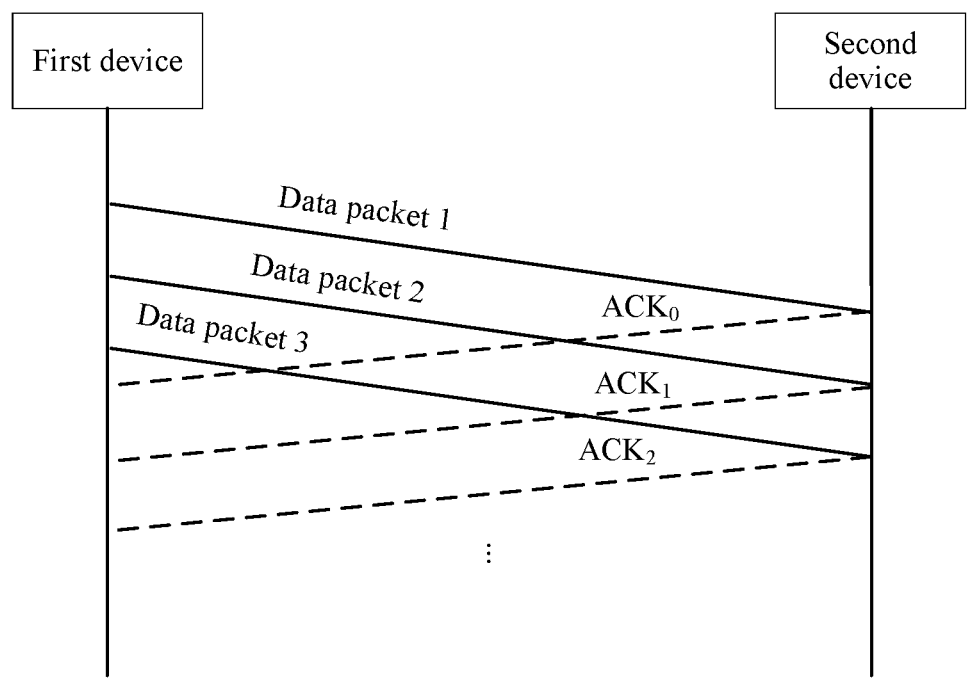
FIG. 4 is a schematic diagram of sending one piece of acknowledgement information for each packet by a first device.
Figure 5:
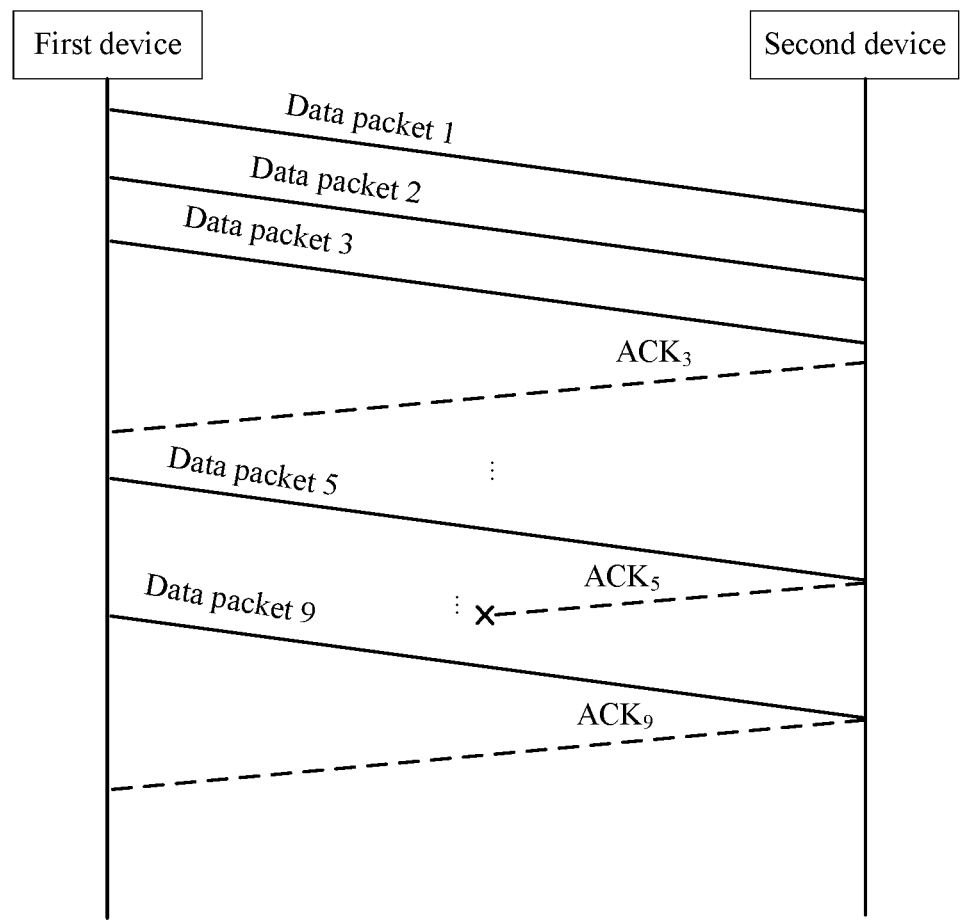
FIG. 5 is a schematic diagram of sending one piece of acknowledgement information for a plurality of packets by a first device.

Optionally, when sending the acknowledgement information to the first device, the second device may perform acknowledgement packet by packet. To be specific, for each received data packet sent in the push mode, the second device sends acknowledgement information to the first device. As shown in FIG. 4, the acknowledgement information may be an acknowledgement (Acknowledgement, ACK) character. Alternatively, as shown in FIG. 5, after receiving a plurality of data packets sent by the first device in the push mode, the second device may send one piece of acknowledgement information to the first device for the plurality of data packets. The acknowledgement information carries a count value N, where N≥1. The count value N is used to indicate that first N data packets sent by the first device are all successfully received by the second device. For example, if the second device sends an $ACK_3$ to the first device, it indicates that a first data packet to a third data packet that are sent by the first device are all successfully received by the second device.

For another example, the second device sends an $ACK_5$ to the first device. However, the $ACK_5$ is lost in a transmission process. In this case, the first device can still determine, based on an ACK (for example, an $ACK_9$) subsequently sent by the second device, that a first data packet to a ninth data packet are all successfully received by the first device.

The second device performs acknowledgement once for a plurality of data packets sent by the first device, so that occupation of network bandwidth by the acknowledgement information can be reduced. In addition, a count value is carried in the acknowledgement information, so that a case in which a piece of acknowledgement information sent by the second device is lost in a transmission process can be tolerated.

Figure 6:
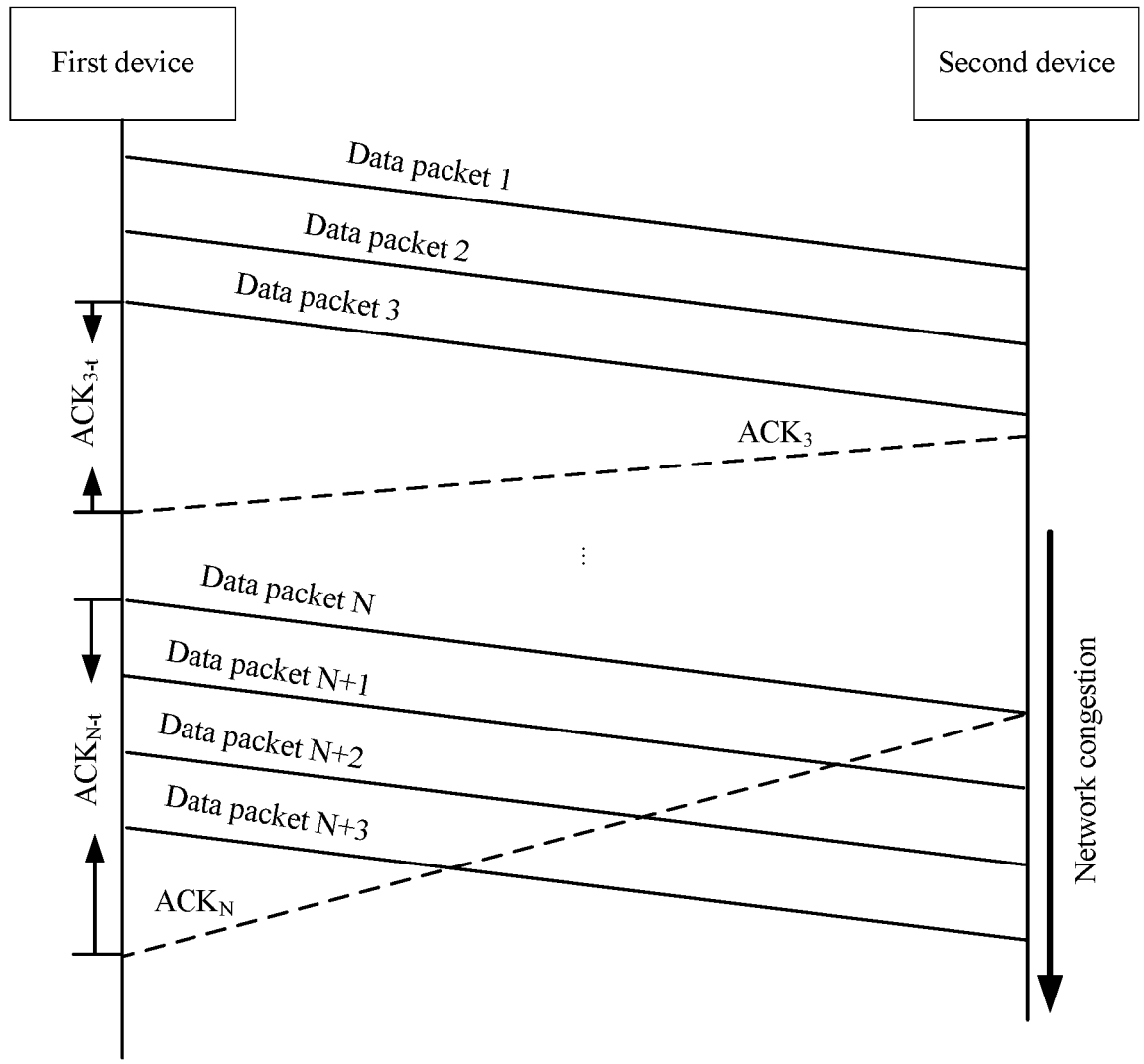
FIG. 6 is a schematic diagram of sending acknowledgement information by a first device during network congestion.

It can be seen from a schematic diagram of ACK return when a network is in a congested state shown in FIG. 6 that, as a network congestion situation is aggravated, a time interval between sending, by the first device, a data packet to the second device and receiving an ACK that is for the data packet and that is sent by the second device also increases. For example, a time interval $ACK_3$-t at which the first device receives an $ACK_3$ is less than a time interval ACKN-t at which the first device receives an ACKN.

The method for determining the network congestion status by the first device in case 1 is described in detail below.

Optionally, that the first device determines the network congestion status includes: determining, by the first device, a quantity of data packets that are in sent data packets and for which no acknowledgement information is received; determining, by the first device, the network congestion status based on the quantity of data packets for which no acknowledgement information is received, where the sent data packets include the first data packet; and if the quantity of data packets for which no acknowledgement information is received is greater than or equal to a preset first threshold, determining, by the first device, that the network is in the congested state.

Specifically, when the first device sends a data packet (for example, the first data packet) to the second device in the push mode, the first device marks a VOQ queue corresponding to the second device as a VOQ queue in a push state, and sets a push data volume counter for the VOQ queue. The push data volume counter records the quantity or a data volume of data packets that are in the data packets sent by the first device to the second device and for which no acknowledgement information is received.

Each time the first device sends one data packet to the second device in the push mode, the push data volume counter of the VOQ queue correspondingly increases by 1. Each time the first device receives one piece of acknowledgement information, the push data volume counter of the VOQ queue correspondingly decreases by 1. If the acknowledgement information is acknowledgement information of acknowledgement performed once for a plurality of data packets, a quantity of the plurality of data packets is correspondingly subtracted from the push data volume counter of the VOQ queue.

To determine the network congestion status, in this embodiment of this application, a push data volume threshold (for example, the preset first threshold) that meets an underloaded capacity is set. The push data volume threshold is used to represent the network congestion status. When the push data volume counter is greater than or equal to the push data volume threshold, it is considered that the network is congested. When the push data volume counter is less than the push data volume threshold, it is considered that the network is in an underloaded state.

After the first device determines the quantity of data packets for which no acknowledgement information sent by the second device is received in the network, when the quantity of data packets for which no acknowledgement information is received is greater than or equal to the preset first threshold, the first device determines that the network is in the congested state.

The push data volume threshold may be statically set, or may be dynamically set based on a network congestion status obtained through measurement, or may be dynamically set.

It should be noted that, in this embodiment of this application, the first device may alternatively determine the network congestion status based on a congestion feedback of the second device. A specific method for determining the network congestion status by the first device is not particularly limited in this embodiment of this application.

A method for dynamically setting the first threshold in this embodiment of this application is described in detail below.

Optionally, the acknowledgement information carries a sending time point at which the first device sends the first data packet. The method further includes: determining, by the first device, a receiving time point of the acknowledgement information; and determining, by the first device, the push data volume threshold based on a difference between the receiving time point of the acknowledgement information and the sending time point of the first data packet.

Specifically, when sending a data packet (for example, the first data packet) to the second device in the push mode, the first device marks the data packet with a sending time stamp (for example, the sending time point) of the data packet. When receiving the data packet, the second device determines the sending time stamp of the data packet, and adds the sending time stamp of the data packet to acknowledgement information for the data packet when sending the acknowledgement information to the first device. Therefore, when receiving the acknowledgement information, the first device can determine the receiving time point of the acknowledgement information, and can further determine the sending time stamp of the data packet corresponding to the acknowledgement information. In this way, the first device determines a difference between the receiving time point of the acknowledgement information and the sending time stamp of the data packet corresponding to the acknowledgement information as round trip time (Round-Trip Time, RTT) of the data packet in the network.

If the RTT time of the data packet is greater than a specific threshold (for example, maximum round trip time $RTT_{max}$), it indicates that the current network is in a severe congested state, and multiplicative-decrease is performed on the push data volume threshold. To be specific, $\beta$ times of an original push data volume threshold are subtracted, where $\beta$ is greater than 0 and is less than 1.

Alternatively, if the RTT time of the data packet is less than a specific threshold (for example, minimum round trip time $RTT_{min}$), it indicates that the current network is in the underloaded state, and linear increase is performed on the push data volume threshold. To be specific, a value of $\delta$ is added, where $\delta$ is greater than 0.

Alternatively, if the RTT time of the data packet is between $RTT_{max}$ and $RTT_{min}$, the push data volume threshold is updated based on a difference between two adjacent times of RTT time. Specifically, if the RTT time of the data packet is less than previous RTT time, linear increase is performed on the push data volume threshold, and a value of $\delta$ is added, where $\delta$ is greater than 0. If the RTT time of the data packet is greater than previous RTT time, multiplicative-decrease is performed on the push data volume threshold, and $\alpha$ times of an original push data volume threshold are subtracted, where a is greater than 0 and less than 1.

A technical solution corresponding to case 2 is described in detail below.

The first sending mode is a request-response mode, and the second sending mode is a push mode. When determining that the current network is not in the congested state, the first device determines to switch a data packet sending mode, that is, determines to send the second data packet to the second device in the push mode.

After the first device sends a data packet (for example, the first data packet) to the second device in the request-response mode, the first device may determine a congestion status of the current network. If the current network is still in the congested state, the first device continues to communicate with the second device in the request-response mode.

Alternatively, if the current network is not in the network congested state, and when the VOQ queue corresponding to the second device meets all the following conditions: the VOQ queue has a data sending requirement, the VOQ queue has no unanswered request message, and wait duration of a first to-be-sent data packet in the VOQ queue is less than a specific threshold, the first device determines that the network between the first device and the second device corresponding to the VOQ queue is in the underloaded state. In this case, the first device determines to send a data packet (for example, the second data packet) to the second device in the push mode.

It should be noted that, the switching the data packet sending mode from the request-response mode to the push mode by the first device in the foregoing case 2 may occur after the switching the data packet sending mode from the push mode to the request-response mode by the first device in the foregoing case 1, or may exist independently. This is not particularly limited in this embodiment of this application.

When the switching the data packet sending mode from the request-response mode to the push mode by the first device in the foregoing case 2 occurs after the switching the data packet sending mode from the push mode to the request-response mode by the first device in the foregoing case 1, because some data packets sent by the first device in the push mode are likely to be detained in the network and do not arrive at the second device in case 1, these data packets may arrive at the second device in case 2. Therefore, the push data volume counter corresponding to the VOQ queue and the push data volume threshold change correspondingly. Therefore, in case 2, the first device may further determine, by comparing values of the push data volume counter and the push data volume threshold, whether the network is in the congested state. For example, when the push data volume counter is greater than or equal to the push data volume threshold, the first device determines that the current network is in the congested state, and continues to communicate with the second device in the request-response mode.

Figure 7:
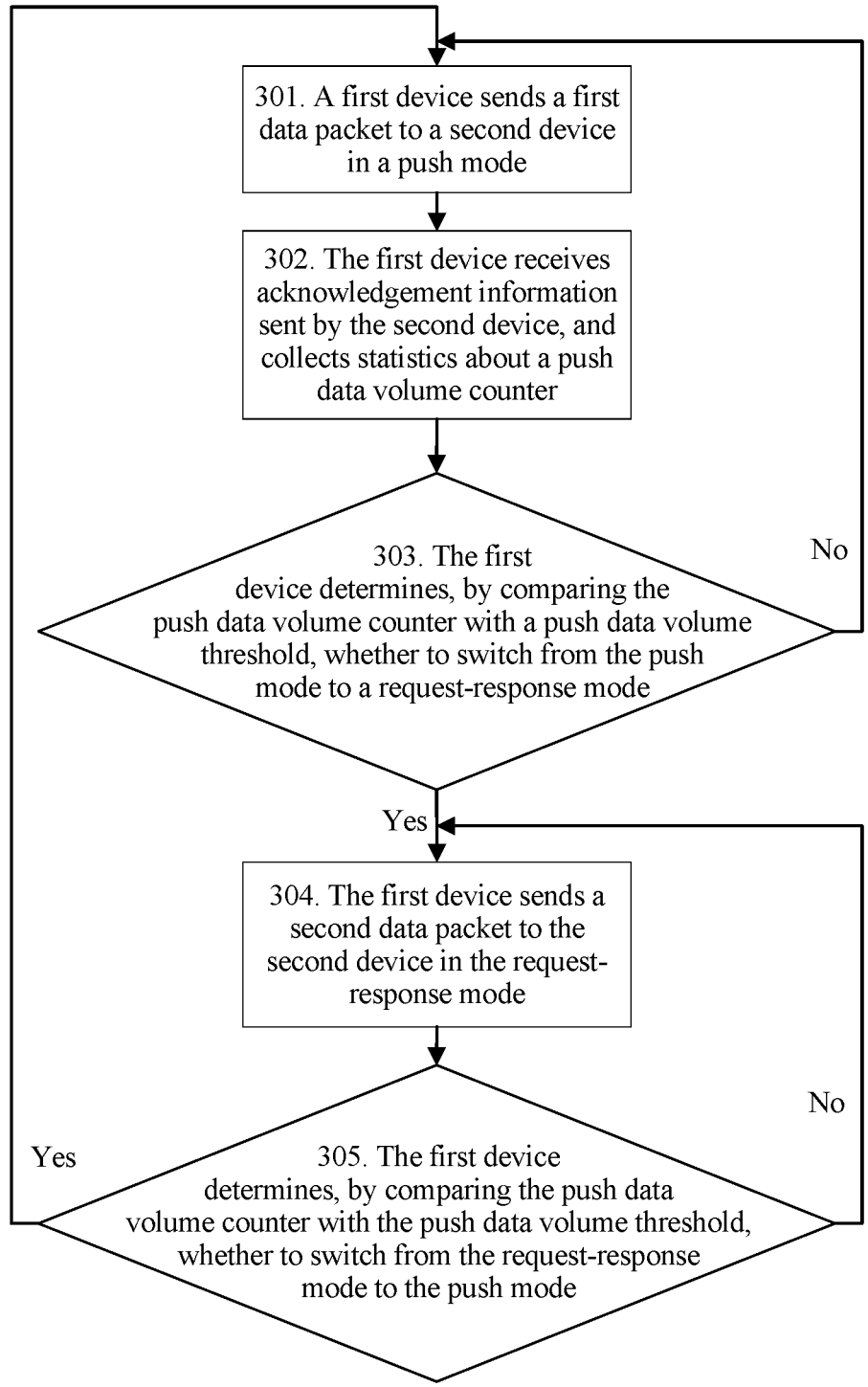
FIG. 7 is another schematic flowchart of a flow control method according to an embodiment of this application.

FIG. 7 is another schematic flowchart of a flow control method 300 according to an embodiment of this application. The method 300 includes at least the following steps.

301. A first device sends a first data packet to a second device in a push mode.

Specifically, the first device initializes a sending mode of a VOQ queue corresponding to the second device as the push mode, and indicates, to the second device by using first indication information carried in the data packet (for example, the first data packet), that the data packet is a data packet sent in the push mode. Each time the first device sends a data packet, a push data volume counter corresponding to the first device increases by 1.

After the data packet arrives at the second device, the second device determines, by using the first indication information, that the received data packet is a data packet sent in the push mode. The second device sends acknowledgement information (for example, an ACK) to the first device to reply to the received data packet.

302. The first device receives acknowledgement information sent by the second device, and collects statistics about a push data volume counter.

Specifically, each time the first device receives one piece of acknowledgement information, the push traffic counter decreases by 1. The first device receives the acknowledgement information sent by the second device, extracts a counter value carried in the acknowledgement information, and correspondingly decreases a value of the corresponding push data volume counter based on the counter value.

303. For a VOQ queue in the push mode, the first device determines, by comparing the push data volume counter with a push data volume threshold, whether to switch from the push mode to a request-response mode.

Specifically, before sending a next data packet to the second device in the push mode, the first device first determines whether the push data volume counter corresponding to the VOQ queue exceeds the set push data volume threshold. If the push data volume counter is less than the set push data volume threshold, 301 is performed.

Otherwise, if the push data volume counter corresponding to the VOQ queue is greater than or equal to the set push data volume threshold, it indicates that a data packet that is between the first device and the second device and that is corresponding to the VOQ queue experiences network congestion. Therefore, the first device switches the sending mode of the VOQ queue to the request-response mode, stops sending a data packet to the second device in the push mode, and performs 304.

304. The first device sends a second data packet to the second device in the request-response mode.

Specifically, the first device sets an authorized data volume counter for the VOQ queue corresponding to the second device. The VOQ queue is marked as a VOQ queue in a request-response state. The first device sends request information to the second device when the authorized data volume counter is 0 or is not sufficient to send a data packet.

Specifically, the first device sends the request information to the corresponding second device. The request information carries a data volume requested by the first device for sending. After receiving the request information, the second device allocates an authorized data volume to the first device based on a rate of the second device or an available volume of a buffer, and sends, to the first device, response information that carries the authorized data volume. After receiving the response information, the first device updates a value of the authorized data volume counter by using the authorized data volume carried in the response information.

When the authorized data volume counter is sufficient to send a data packet, the first device sends a data packet to the second device by using a data volume indicated by the authorized data volume counter, and subtracts a data volume corresponding to the data packet from the authorized data volume counter.

305. For the VOQ queue in the request-response mode, the first device determines, by comparing the push data volume counter with the push data volume threshold, whether to switch from the request-response mode to the push mode.

Specifically, if the push data volume counter corresponding to the VOQ queue is greater than or equal to the set push data volume threshold, step 304 is performed.

Otherwise, if the push data volume counter corresponding to the VOQ queue is less than the set push data volume threshold, and the VOQ queue meets the following conditions: the VOQ queue has a data sending requirement, the VOQ queue has no unanswered request message, and wait duration of a first to-be-sent data packet in the VOQ queue is less than a specific threshold, 301 is performed.

It should be noted that, in this embodiment of this application, the foregoing push mode may also be referred to as a passive flow control mode, the push state may also be referred to as a passive flow control state, the foregoing request-response mode may also be referred to as an active flow control mode, and the request-response state may also be referred to as an active flow control state. This is not particularly limited in this embodiment of this application.

It should be further noted that content in the push data volume counter may be a quantity of data packets, or may be a data volume. Correspondingly, content in the push data volume threshold may also be a quantity of data packets, or may be a data volume, but needs to be consistent with the content in the push data volume counter.

Similarly, content in the authorized data volume counter may be a quantity of data packets, or may be a data volume. Correspondingly, content in the authorized data volume may also be a quantity of data packets, or may be a data volume, but needs to be consistent with the content in the authorized data volume counter.

According to the flow control method in this embodiment of this application, the first device evaluates the congestion status of the network, and sends a data packet in the push mode when the network is underloaded, so as to reduce network latency; and sends a data packet in the request-response mode when network overload causes serious congestion, so as to alleviate a congestion degree of the network and improve a network throughput. The data packet sending mode is dynamically switched, so that all devices in the network transmit data packets in the push mode when the network is underloaded, some devices in the network transmit data packets in the request-response mode when the network is slightly congested, and all the devices in the network transmit data packets in the request-response mode when the network overload causes serious congestion, thereby implementing a relatively high network throughput and reducing network latency.

The foregoing describes the flow control method provided in the embodiments of this application with reference to FIG. 3 to FIG. 7. The following describes a first device and a second device provided in the embodiments of this application with reference to FIG. 8 to FIG. 11.

Figure 8:
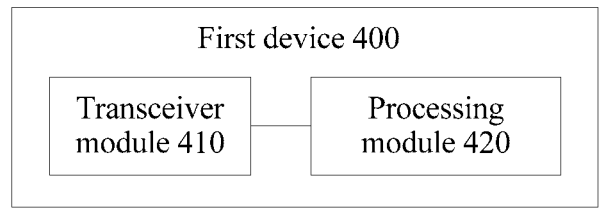
FIG. 8 is a schematic block diagram of a first device according to an embodiment of this application.

FIG. 8 is a schematic block diagram of a first device 400 according to an embodiment of this application. The first device 400 includes:

a transceiver module 410, configured to send a first data packet to a second device in a first sending mode; and a processing module 420, configured to determine a network congestion status.

The transceiver module 410 is further configured to:

send a second data packet to the second device in the second sending mode, where the second sending mode is a sending mode determined by the first device based on the network congestion status, and the second data packet is a data packet to be sent after the first data packet.

Optionally, the first sending mode is a push mode, the second sending mode is a request-response mode, the first data packet carries first indication information, and the first indication information is used to indicate that the first data packet is a data packet sent in the push mode.

Optionally, the transceiver module 410 is further configured to:

when the network is in a congested state, send request information to the second device, where the request information is used to request the second device to allocate a data volume to the first device.

The transceiver module 410 is further configured to:

send the second data packet to the second device by using the data volume allocated by the second device.

Optionally, the transceiver module 410 is further configured to:

after the first device sends the first data packet to the second device in the first sending mode, receive acknowledgement information sent by the second device, where the acknowledgement information is used to indicate that the second device successfully receives the first data packet.

The processing module 420 is further configured to:

determine a quantity of data packets that are in sent data packets and for which no acknowledgement information is received.

The processing module 420 is further configured to:

determine the network congestion status based on the quantity of data packets for which no acknowledgement information is received, where the sent data packets include the first data packet.

The processing module 420 is further configured to:

if the quantity of data packets for which no acknowledgement information is received is greater than or equal to a preset first threshold, determine that the network is in the congested state.

Optionally, the acknowledgement information carries a sending time point at which the first device sends the first data packet, and the processing module 420 is further configured to:

determine a receiving time point of the acknowledgement information.

The processing module 420 is further configured to:

determine the first threshold based on a difference between the receiving time point of the acknowledgement information and the sending time point of the first data packet.

Optionally, the acknowledgement information carries a count value N, N≥1, and the count value N is used to indicate that first N data packets sent by the first device are all successfully received by the second device.

Optionally, the first sending mode is a request-response mode, and the second sending mode is a push mode.

Optionally, the transceiver module 410 is further configured to:

when the network is not in a congested state, send the second data packet to the second device in the second sending mode.

It should be understood that in this embodiment of this application, the processing module 420 may be implemented by a processor or a processor-related circuit component, and the transceiver module 410 may be implemented by a transceiver or a transceiver-related circuit component.

Figure 9:
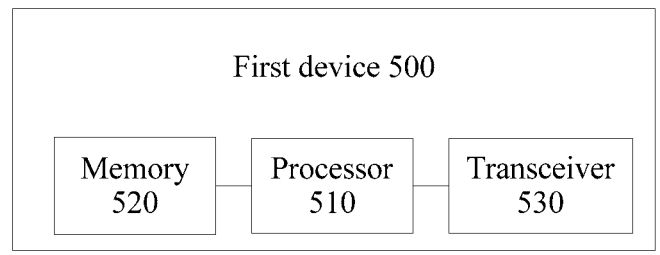
FIG. 9 is another schematic block diagram of a first device according to an embodiment of this application.

As shown in FIG. 9, an embodiment of this application further provides a first device 500. The first device 500 includes a processor 510, a memory 520, and a transceiver 530. The memory 520 stores an instruction or a program, and the processor 540 is configured to execute the instruction or the program stored in the memory 520. When the instruction or program stored in the memory 520 is executed, the processor 510 is configured to perform an operation performed by the processing module 420 in the foregoing embodiment, and the transceiver 530 is configured to perform an operation performed by the transceiver module 410 in the foregoing embodiment.

Figure 10:
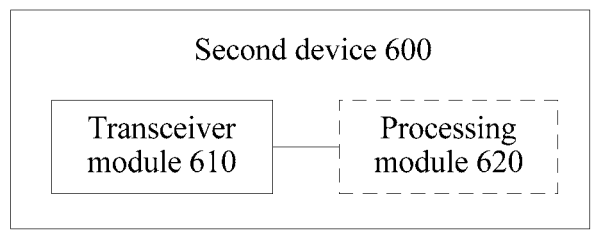
FIG. 10 is a schematic block diagram of a second device according to an embodiment of this application.

FIG. 10 is a schematic flowchart of a second device 600 according to an embodiment of this application. The second device 600 includes:

a transceiver module 610, configured to receive a first data packet sent by a first device in a first sending mode.

The transceiver module 610 is further configured to:

receive a second data packet sent by the first device in a second sending mode, where the second sending mode is a sending mode determined by the first device based on the network congestion status, and the second data packet is a data packet to be sent after the first data packet.

Optionally, the first sending mode is a push mode, the second sending mode is a request-response mode, the first data packet carries first indication information, and the first indication information is used to indicate that the first data packet is a data packet sent in the push mode.

Optionally, the transceiver module 610 is further configured to:

receive request information sent by the first device, where the request information is used to request the second device to allocate a data volume to the first device.

The second device further includes:

a processing module 620, configured to allocate the data volume to the first device based on the request information, where the data volume is used by the first device to send the second data packet to the second device.

Optionally, the transceiver module 610 is further configured to:

after the second device receives the first data packet sent by the first device in the first sending mode, send acknowledgement information to the first device, where the acknowledgement information is used to indicate that the second device successfully receives the first data packet.

Optionally, the acknowledgement information carries a sending time point at which the first device sends the first data packet.

Optionally, the acknowledgement information carries a count value N, N≥1, and the count value N is used to indicate that first N data packets sent by the first device are all successfully received by the second device.

Optionally, the first sending mode is a request-response mode, and the second sending mode is a push mode.

It should be understood that in this embodiment of this application, the processing module 620 may be implemented by a processor or a processor-related circuit component, and the transceiver module 510 may be implemented by a transceiver or a transceiver-related circuit component.

Figure 11:
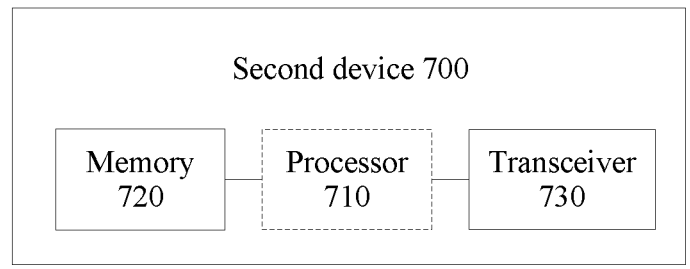
FIG. 11 is another schematic block diagram of a second device according to an embodiment of this application.

As shown in FIG. 11, an embodiment of this application further provides a second device 700. The second device 700 includes a processor 710, a memory 720, and a transceiver 730. The memory 720 stores an instruction or a program, and the processor 730 is configured to execute the instruction or the program stored in the memory 720. When the instruction or program stored in the memory 720 is executed, the processor 710 is configured to perform an operation performed by the processing module 620 in the foregoing embodiment, and the transceiver 730 is configured to perform an operation performed by the transceiver module 610 in the foregoing embodiment.

It should be understood that, the processor mentioned in the embodiments of this application may be a central processing unit (Central Processing Unit, CPU), or may be another general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or transistor logic device, a discrete hardware component, or the like. The general purpose processor may be a microprocessor or the processor may be any conventional processor, or the like.

It should be further understood that, the memory mentioned in the embodiments of this application may be a volatile memory or a nonvolatile memory, or may include a volatile memory and a nonvolatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. For example but not for limitation, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that, when the processor is a general-purpose processor, a DSP, an ASIC, an FPGA, or another programmable logic device, a discrete gate or a transistor logic device, or a discrete hardware component, the memory (storage module) is integrated into the processor.

It should be noted that the memory described in this specification aims to include but is not limited to these memories and any memory of another proper type.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A flow control method, comprising:
    sending, by a first communications device, a first data packet to a second communications device in a push mode;
    receiving, by the first communications device, an acknowledgement from the second communications device;
    determining, by the first communications device, that a network is in a congested state; and
    sending, by the first communications device, a second data packet to the second communications device in a request-response mode, wherein the request-response mode for sending the second data packet comprises:
    sending, by the first communications device, request information to request the second communications device to allocate a data volume to the first communications device for sending the second data packet;
    receiving, by the first communications device and from the second communications device, response information that comprises an authorized data volume determined by the second communications device;
    adding, by the first communications device, the authorized data volume to an authorized data volume counter corresponding to the second communications device to produce an updated authorized data volume counter;
    determining, by the first communications device, that the updated data volume counter is sufficient for sending the second data packet
    sending, by the first communications device, the second data packet to the second communications device; and
    subtracting a data volume of the second data packet from the updated data volume counter.

2. The method according to claim 1, wherein the acknowledgement is received in response to the second communications device identifying that the first data packet is sent in the push mode, and wherein the determining the network is in a congested state comprises:
    determining a quantity of data packets of the first data packets sent where no acknowledgement information is received; and
    determining that the network is in a congested state based on the quantity determining that the quantity is greater than or equal to a preset threshold.

3. The method according to claim 2, wherein the acknowledgement includes a first time point indicating a time the first data packet is sent by the first communications device, and the method further comprising:
    determining, by the first communications device, a receiving time point indicating the acknowledgement information is received; and
    determining, by the first communications device, the preset threshold based on a difference between the first time point and a second time point that the acknowledgement is received.

4. The method according to claim 3, wherein the acknowledgement information includes a count value N, N≥1, and the count value N indicates that N data packets sent by the first communications device are successfully received by the second communications device.

5. A flow control method, comprising:
    receiving, by a second communications device, a first data packet sent by a first communications device in a push mode;
    sending, by the second communications device, an acknowledgement to the first communications device; and
    receiving, by the second communications device, a second data packet sent by the first communications device in a request-response mode, wherein the request-response mode for receiving the second data packet comprises:
    receiving, by the second communications device, request information to request the second communications device to allocate a data volume to the first communications device for sending the second data packet;
    determined, by the second communications device, an authorized data volume;
    sending, by the second communications device to the first communications device, response information that comprises the authorized data volume; and
    receiving, by the second communications device, the second data packet sent from the first communications device, wherein the authorized data volume is added by the first communications device to an authorized data volume counter corresponding to the second communications device to produce an updated authorized data volume counter and subtracted from the updated authorized data volume counter after the second data packet is sent.

6. The method according to claim 5, wherein the acknowledgement is received in response to the second communications device identifying that the first data packet is sent in the push mode.

7. The method according to claim 6, wherein the acknowledgement includes a first time point indicating a time the first communications device sends the first data packet.

8. The method according to claim 7, wherein the acknowledgement includes a count value N, N≥1, and the count value N indicates that N data packets sent by the first communications device are successfully received by the second communications device.

9. A first communications device, comprising:
    at least one processor;
    a memory coupled to the at least one processor and storing programming instructions for execution by the at least one processor, the programming instructions instruct the at least one processor to:

receive an acknowledgement from a second communications device;
determine that a network is in a congested state; and
send a first data packet to a second communications device in a push mode; and
send a second data packet to the second communications device in a request-response mode, wherein the request-response mode for sending the second data packet comprises:
sending, by the first communications device, request information to request the second communications device to allocate a data volume to the first communications device for sending the second data packet;
receiving, by the first communications device and from the second communications device, response information that comprises an authorized data volume determined by the second communications device;
adding, by the first communications device, the authorized data volume to an authorized data volume counter corresponding to the second communications device to produce an updated authorized data volume counter;
determining, by the first communications device, that the updated data volume counter is sufficient for sending the second data packet sending, by the first communications device, the second data packet to the second communications device; and
subtracting a data volume of the second data packet from the updated data volume counter.

10. The first communications device according to claim 9, wherein the acknowledgement is received in response to the second communications device identifying that the first data packet is sent in the push mode, and wherein the determining the network is in a congested state comprises:
determining a quantity of data packets of the first data packets sent where no acknowledgement information is received; and
determining that the network is in a congested state based on determining that the quantity is greater than or equal to a preset threshold.

11. The first communications device according to claim 10, wherein the acknowledgement information includes a first time point indicating a time the first data packet is sent by the first communications device, and the programming instructions further instruct the at least one processor to:
determine a second time point that the acknowledgement is received; and
determine the preset threshold based on a difference between the first time point and the second time point.

12. The method according to claim 1, wherein the quantity of data packets sent is indicated by a data volume counter of a virtual output queue (VOQ) corresponding to the second communications device.

13. The method according to 12, wherein the data volume counter of the VOQ increases by 1 in response to sending a data packet to the second communications device, and the data volume counter decreases by 1 when an acknowledgement is received from the second communications device.

14. The method according to 13, wherein a sending mode of the VOQ is in a push mode when the counter of the VOQ is less than a preset threshold.

15. The method according to claim 14, wherein the network determined as in a congested state in response to determining that the counter of the VOQ is greater than or equal to the preset threshold, and the method further comprising:
switching, by the first communications device, the sending mode of the VOQ from the push mode to the request-response mode in response to determining that the counter of the VOQ is greater than or equal to the preset threshold, wherein the authorized data volume counter is the counter of the VOQ in the request-response mode.

16. The method according to claim 5, wherein the quantity of data packets sent is indicated by a data volume counter of a virtual output queue (VOQ) corresponding to the second communications device.

17. The method according to 16, wherein the data volume counter of the VOQ increases by 1 in response to sending a data packet to the second communications device, and the data volume counter decreases by 1 when an acknowledgement is received from the second communications device.

18. The method according to 17, wherein a sending mode of the VOQ is in a push mode when the counter of the VOQ is less than a preset threshold.

19. The first communications device according to claim 9, wherein the quantity of data packets sent is indicated by a data volume counter of a virtual output queue (VOQ) corresponding to the second communications device.

20. The first communications device according to 19, wherein the data volume counter of the VOQ increases by 1 in response to sending a data packet to the second communications device, and the data volume counter decreases by 1 when an acknowledgement is received from the second communications device.

* * * * *

UNITED STATES PATENT AND TRADEMARK OFFICE
CERTIFICATE OF CORRECTION

PATENT NO. : 11,323,916 B2
APPLICATION NO. : 16/834192
DATED : May 3, 2022
INVENTOR(S) : Zheng Cao, Xiaoli Liu and Nongda Hu It is certified that error appears in the above-identified patent and that said Letters Patent is hereby corrected as shown below:

In the Claims

Column 21/Line 55 - In Claim 1, delete "packet" and insert -- packet; --.

Column 22/Line 2 - In Claim 2, delete "on the quantity" and insert -- on --.

Column 23/Line 24 - In Claim 9, delete "packet" and insert -- packet; --.

Column 24/Line 5 (Approx.) - In Claim 13, delete "according to" and insert -- according to claim --.

Column 24/Line 10 (Approx.) - In Claim 14, delete "according to" and insert -- according to claim --.

Column 24/Line 29 (Approx.) - In Claim 17, delete "according to" and insert -- according to claim --.

Column 24/Line 35 (Approx.) - In Claim 18, delete "according to" and insert -- according to claim --.

Column 24/Line 42 (Approx.) - In Claim 20, delete "according to" and insert -- according to claim --.

Signed and Sealed this
Fourth Day of October, 2022

Katherine Kelly Vidal
*Director of the United States Patent and Trademark Office*